United States Patent [19]

Hamann

[11] Patent Number: 5,215,176
[45] Date of Patent: Jun. 1, 1993

[54] DEVICE FOR OPERATING A CLUTCH, ESPECIALLY AN AUTOMOTIVE CLUTCH

[75] Inventor: Horst Hamann, Ruesselsheim, Fed. Rep. of Germany

[73] Assignee: General Motors Corporation, Detroit, Mich.

[21] Appl. No.: 857,864

[22] Filed: Mar. 26, 1992

[30] Foreign Application Priority Data

Mar. 30, 1991 [DE] Fed. Rep. of Germany ....... 4110476

[51] Int. Cl.⁵ ............................................. G05G 1/14
[52] U.S. Cl. ................................... 192/99 S; 74/512; 74/516; 74/97.1
[58] Field of Search ................ 192/99 S; 74/512, 470, 74/516, 517, 518, 97.1

[56] References Cited

U.S. PATENT DOCUMENTS

| | | | |
|---|---|---|---|
| 2,882,744 | 4/1959 | Keller | 192/99 S X |
| 3,199,367 | 8/1965 | Zetye | 192/99 S X |
| 3,739,579 | 6/1973 | Lutz | 74/512 X |
| 4,227,603 | 10/1980 | Frasano | 74/512 X |
| 4,281,753 | 8/1981 | Takemoto et al. | 192/99 S |
| 4,381,053 | 4/1983 | Hyodo | 192/99 S X |
| 4,399,901 | 8/1983 | Kobayashi et al. | 192/111 A |
| 4,800,774 | 1/1989 | Hagiwara et al. | 74/512 |
| 4,846,012 | 7/1989 | Papenhagen et al. | 192/99 S X |

FOREIGN PATENT DOCUMENTS

| | | |
|---|---|---|
| 2923027C2 | 2/1985 | Fed. Rep. of Germany . |
| 3636748C1 | 5/1987 | Fed. Rep. of Germany . |
| 872854 | 7/1961 | United Kingdom ............ 192/99 S |
| 2035499 | 6/1980 | United Kingdom ............ 192/99 S |

Primary Examiner—Leslie A. Braun
Assistant Examiner—Andrea Pitts
Attorney, Agent, or Firm—Donald F. Scherer

[57] ABSTRACT

A device for operating a clutch, especially an automotive clutch, has a clutch lever with two end positions, a past-dead-center spring that acts on the clutch lever, which spring exerts a force on the clutch lever when the clutch lever is positioned between the dead-center position and an end position, such that the force is directed towards this end position, and finally, additional spring mechanisms, which act on the clutch lever to reduce the pedal force that must be applied to it between the end position corresponding to the engaged state of the clutch and the dead-center position. The additional spring mechanisms are designed and mounted in such a way that they are in actual working contact with the clutch lever only from the end position of the clutch lever corresponding to the engaged state of the clutch to the dead-center position of the clutch lever.

7 Claims, 2 Drawing Sheets

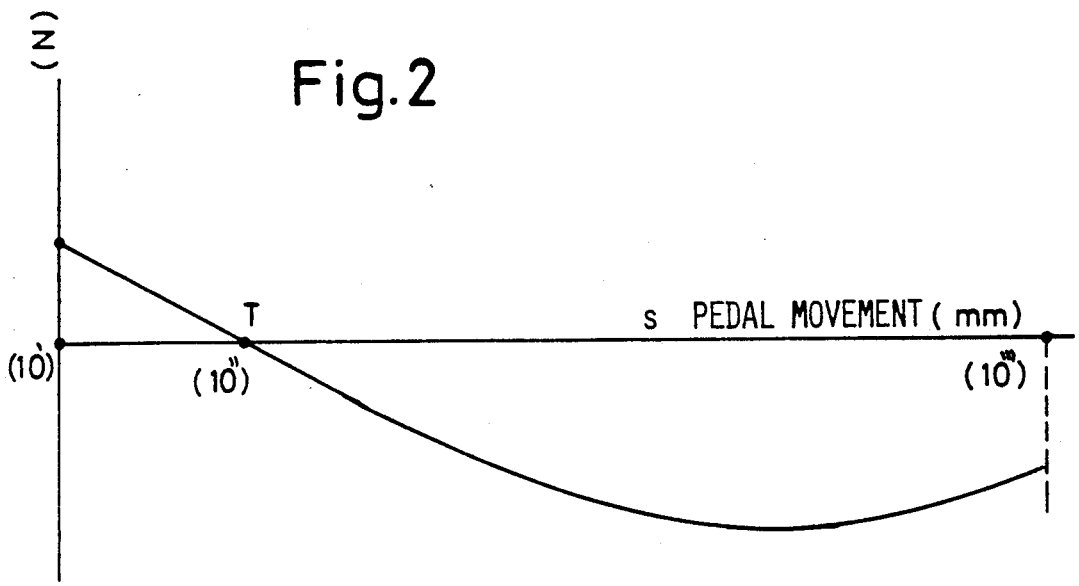
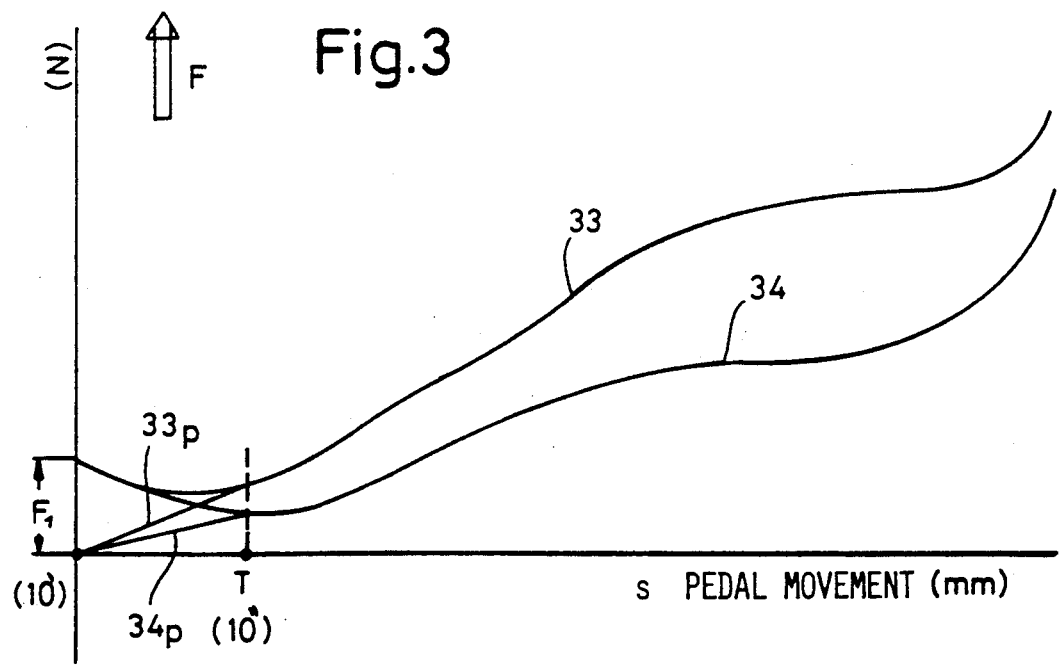

DEVICE FOR OPERATING A CLUTCH, ESPECIALLY AN AUTOMOTIVE CLUTCH

BACKGROUND OF THE INVENTION

The invention pertains to a device for operating a clutch, especially an automotive clutch, with a clutch lever pivoted on a pedal mount or on a similar stationary support part, which clutch lever has two end positions, one of which corresponds to the engaged state of the clutch, while the other corresponds to the disengaged state of the clutch, with a past-dead-center spring or overcenter spring that acts on the clutch lever, which spring exerts a force on the clutch lever when the clutch lever is positioned between the dead-center position and an end position, such that the force is directed towards this end position, and with additional spring mechanisms, which act on the clutch lever to reduce the pedal force that must be applied to it between the end position corresponding to the engaged state of the clutch and the dead-center position.

Systems for reducing the pedal force during the clutch disengagement process are well known and are used by many car manufacturers. The basic problem here is to reduce to a reasonable level the amount of pedal force that must be applied to the clutch lever during clutch disengagement, since the necessary force is quite large due to the necessarily high contact pressure of clutches for modern high-powered engines. This problem is solved with the use of a past-dead-center spring that acts on the clutch lever.

However, the advantage obtained with the past-dead-center spring in the prior art, namely, pedal force reduction between the dead center and the disengagement end position of the clutch lever, is accompanied by the disadvantage of an undesirable increase in the pedal force that must be applied at the beginning of the clutch lever travel path, i.e., from the engagement end position of the clutch lever to the dead-center position.

German patent DE-PS 36 36 748 describes a device of the type known in the art. The purpose of this device is to achieve a low pedal force over the entire travel distance of the clutch lever and thus to improve driver comfort. In this device, a compensating spring that acts continuously on the clutch lever is used as the additional spring mechanism. This has the disadvantage that the force of the compensating spring acting on the clutch lever is added to the force of the past-dead-center spring after the dead-center position has been reached and until the clutch lever arrives in its disengagement end position. To reduce this undesirable effect, DE-PS 36 36 748 proposes expensive measures, which, to put it simply, are based on suitable dimensioning and/or lever action of the compensating spring. However, the undesired addition of spring forces along the segment of the clutch lever travel path between dead center and the disengagement end position cannot be entirely eliminated.

SUMMARY OF THE INVENTION

The goal of the invention was to develop simple design measures that would allow the additional spring mechanisms to act on the clutch lever exclusively along the first segment of the clutch lever travel path between the engagement end position and the dead-center position for the purpose of reducing the pedal force that must be applied, but that would not allow the additional spring mechanisms to act on the clutch lever along the second segment of its path between dead center and the disengagement end position.

In accordance with the invention, this goal is achieved in a device mounting the additional spring mechanisms in such a way that they are in actual working contact with the clutch lever only from the end position of the clutch lever corresponding to the engaged state of the clutch to the dead-center position of the clutch lever.

Due to the fact that the additional spring mechanisms of the invention no longer have any working contact with the clutch lever once it has reached its dead-center position during the clutch disengagement process, the additional spring mechanisms do not act on the clutch lever at all along the second segment of its travel path. Therefore, complicated measures, of the prior art to reduce torque, are not required.

Consequently, the additional spring mechanisms can be mounted in a simple way. For example, a helical coil compression spring is conceivable. In accordance with a preferred embodiment of the invention, a rubber cushion is used as the additional spring mechanism. It is mounted between the clutch lever and either the pedal mount or a part rigidly attached to the pedal mount in such a way that it is prestressed by the clutch lever on the segment of the clutch lever travel path between the dead-center position of the clutch lever and its end position corresponding to the engaged state of the clutch.

The rubber cushion of the invention is conveniently mounted near the clutch lever joint on the pedal mount or on a part rigidly attached to the pedal mount, and its free end interacts with the clutch lever.

Alternatively, however, it is possible to mount the rubber cushion on the clutch lever itself near the clutch lever joint and thus allow its free end to interact with the pedal mount or with a stationary part attached to the pedal mount.

A rubber cushion of this type is easy to produce, can be easily replaced, when necessary, and produces only extremely small amounts of noise.

Either a linear or nonlinear spring characteristic can be obtained by suitable choice of already well-known forms of rubber for the rubber cushion.

A rise in pedal force over the pedal distance that feels comfortable to the driver can be advantageously achieved with a nonlinear spring characteristic in combination with the past-dead-center spring force.

The invention is illustrated and further explained by the specific embodiment of the invention that is shown in the drawing and described below.

DESCRIPTION OF THE DRAWINGS

FIG. 2 is a force-distance diagram for the force exerted on the clutch lever in FIG. 1 by a past-dead-center spring during the clutch operation process.

FIG. 3 is a force-distance diagram for the pedal force that must be applied to the clutch lever in FIG. 1 during the clutch operation process.

DESCRIPTION OF THE EMBODIMENT

Figure 1:
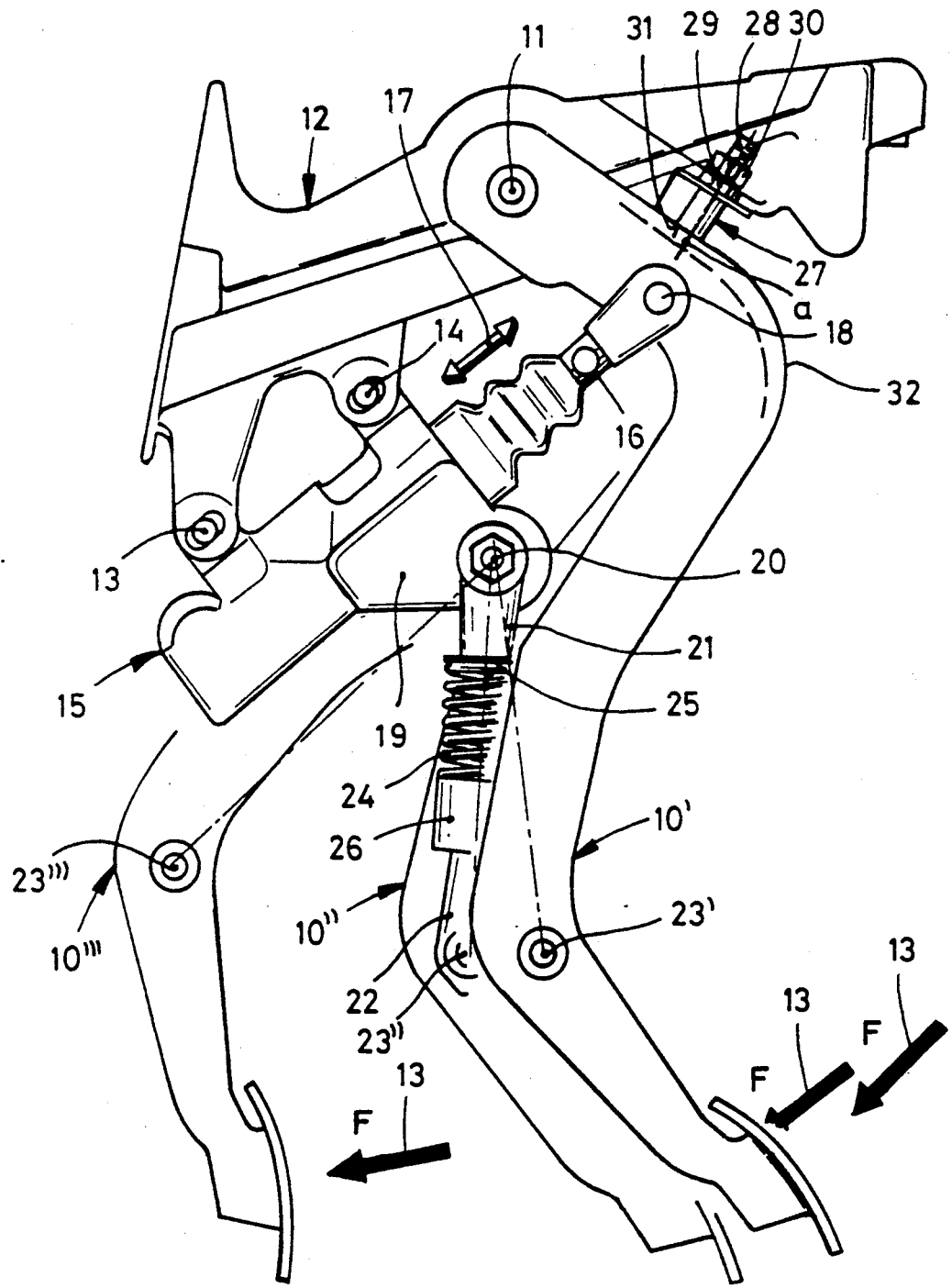
FIG. 1 is a lateral view of a clutch lever for operating an automotive clutch.

In FIG. 1, a clutch lever, designated 10, is pivoted at 11 on a pedal mount 12, which is attached to the body (not shown) of a motor vehicle. FIG. 1 shows the clutch lever 10 in three different positions (10', 10" and 10''').

One end position 10' of the clutch lever corresponds to the engaged state of the clutch, and another end position 10''' of the clutch lever corresponds to the disengaged state. An intermediate position 10'' of the clutch lever represents the so-called dead-center position.

The pedal force, applied to the clutch lever at F in direction 13, is transmitted hydraulically to the clutch (not shown). A hydraulic cylinder 15 is mounted on the pedal mount 12 at 13 and 14 for this purpose. A hydraulic piston moves in the hydraulic cylinder in the direction of arrow 17, and its piston rod 16 is pivoted on the clutch lever 10 at 18.

A spring guide 21 is pivoted at 20 on an angular projection 19 of the hydraulic cylinder 15. A second spring guide 22 articulates with the clutch lever 10 approximately in the lower third of the clutch lever. This joint is labeled with reference number 23. The two spring guides 21 and 22 are designed and mounted in such a way that they can move relative to each other in the direction of their (congruent) longitudinal axes. The spring guides 21 and 22 hold a helical coil compression spring 24, which is supported at one end on a stop 25 of the first spring guide 21 and at the other end on a should 26 of the second spring guide 22.

In this system, the helical coil compression spring 24 acts as a past-dead-center spring, which reduces the pedal force required to disengage the clutch.

The compression spring 24 is most strongly stressed at the dead-center position 10'. Nevertheless, the reducing force (FIG. 2) equals zero, since the spring attachment points at 20 and 23 and the center of rotation 11 of the clutch lever 10 all lie on a straight line, so that there is no resultant lever arm and thus no resultant moment from the force of the compression spring 24. If the pedal is now moved toward 10''', there is a resultant lever arm for the force of the compression spring 24, so that a moment is applied to the clutch lever 10 in the direction of clutch disengagement. However, when the pedal moves towards 10', a lever arm develops in such a way that the moment resulting from the force of the compression spring 24 and this lever arm amplifies the pedal operating force. In both cases, the compression spring 24 relaxes from the stretched position of the past-dead-center spring shown in the drawing.

The desired reducing characteristic curve (FIG. 2) can be adjusted by suitable choice of the spring constant, the spring prestress and the geometry of the spring pivot.

In the first segment of the clutch lever path, i.e., from position 10' to the dead-center position 10'', there is an undesired increase in pedal force, but from the dead-center position 10'', the pedal force is supported by the compression spring 24 as a result of the torque reversal, and this support develops in the region in which the pedal force are otherwise uncomfortably high.

The unavoidable increase in pedal force in the first segment of the clutch lever path is a result of the lever geometry and kinematics of the clutch lever 10, on the one hand, and of the compression spring 24 and spring guides 21, 22, on the other hand. In FIG. 2, it is plotted on the y-axis as a function of the pedal distance s of the clutch lever 10. The graph shows that the increase in pedal force is greatest at the beginning of the clutch lever path, and that it continuously decreases to zero at the dead-center position T (position 10'' in FIG. 1). Once the clutch lever has moved beyond the dead-center position, the opposite effect is observed, namely, a (desired) decrease in pedal force until the other extreme position 10''' of the clutch lever is reached (=the disengaged state of the clutch).

To compensate for the undesired increase in pedal force along the partial travel path of the clutch lever 10 from 10' to 10'', additional spring mechanisms are provided, as shown in FIG. 1. The spring mechanism shown here is a rubber cushion 27, which has a screw bolt 28 on its backside. The bolt 28 enters a recess 29 in the pedal mount 12. A nut 30 secures the bolt 28 and thus the entire rubber cushion 27 on the pedal mount 12.

At its free end surface 31, the rubber cushion 27 interacts with the clutch lever 10, but only in the first segment of the clutch lever path from 10' to 10''. For this purpose, the rubber cushion 27 is suitably prestressed by the clutch lever in the end position 10' corresponding to the engaged state of the clutch. When the clutch lever 10 is operated in the direction of arrow 13, the rubber cushion 27 relaxes until it loses all of its prestress in the dead-center position 10'' of the clutch lever. At the same time, this provides a corresponding amount of support to the pedal force F in the direction of arrow 13.

Accordingly, the mounting, dimensioning and prestress of the rubber cushion 27 must be designed in such a way that contact between the rubber cushion 27 and the clutch lever 10 is eliminated from the dead-center position 10'' to the end position 10''' (disengagement of the clutch). On the other hand, contact between the rubber cushion 27 and the clutch lever 10 must be guaranteed in the first segment of the travel path of the clutch lever from 10' to 10''. As the specific example in FIG. 1 shows, these requirements can be satisfied in an especially simple way if the rubber cushion is mounted near the joint axis 11 of the clutch lever 10, and if the clutch lever has a suitable bulge in this area (in FIG. 1 directed to the right and labeled with reference number 32). The distance that this section of the clutch lever 10 moves between positions 10' and 10'' is represented by the relatively short length as seen in FIG. 1.

The diagram in FIG. 3 has two curves (an upper curve 33 and a lower curve 34), which show how the rubber cushion 27 compensates the (undesired) increase in pedal force F caused by the past-dead-center spring (compression spring 24) in the first segment of the clutch lever path from 10' to 10''. The upper curve 33 shows the pedal force F that must be applied by the driver of the vehicle to depress the clutch lever 10, i.e., to disengage the clutch. The lower curve 34, on the other hand, represents the restoring force available for the return of the clutch lever during engagement of the clutch.

The primary consideration in the present case is the first segment of the clutch lever travel path between the engaged end position 10' and the dead-center position T (10''). The upwardly extending left ends show how curves 33 and 34 would behave if the rubber cushion 27 were not used. We see that, in this case, a relatively large force $F_1$ would have to be applied to the clutch lever 10 at the beginning of the clutch disengagement process. This force would decline to a minimum value approximately at the dead-center position T (10'') and then rise continuously due to the increasing clutch spring resistance (curve 33). On the other hand, the lines ($33_p$ and $34_p$) show how curves 33 and 34 behave in the region from 10' to 10'' when the additional spring mechanisms of the invention are used (rubber cushion 27). In this case, the pedal force F begins at zero and rises continuously to the dead-center position 10'' (T) at more or less the same rate as for the remainder of the clutch operation path.

The simple design measures described above result in the important advantage that the additional spring mechanisms act exclusively in the first segment of the clutch lever travel path between the engaged end position and the dead center to reduce the pedal force that must be applied, but they do not act in the second segment between the dead center and the disengaged end position of the clutch lever.

The embodiments of the invention in which an exclusive property or privilege is claimed are defined as follows:

1. A device for operating a clutch, especially an automotive clutch, with a clutch lever pivoted on a pedal mount or on a similar stationary support part, which clutch lever has two end positions, one of which corresponds to an engaged state of the clutch, while the other corresponds to a disengaged state of the clutch, with a past-dead-center spring that acts on the clutch lever, which spring exerts a force on the clutch lever when the clutch lever is positioned between a dead-center position and an end position, such that the force is directed towards this end position, and with additional spring means, which act on the clutch lever to reduce a pedal force that must be applied to it between the end position corresponding to the engaged state of the clutch and the dead-center position, characterized by the fact that an additional spring mechanism is designed and arranged in such a way that it is in actual working contact with the clutch lever only from the end position of the clutch lever which corresponds to the engaged state of the clutch to the dead-center position of the clutch lever 2. A device in accordance with claim 1, characterized by the fact that a rubber cushion serves as the additional spring means, which is mounted between the clutch lever and either the pedal mount or a stationary part attached to the pedal mount in such a way that it is prestressed by the clutch lever on a portion of the clutch lever travel path lying between the dead-center position of the clutch lever and its end position corresponding to the engaged state of the clutch.

3. A device in accordance with claim 2, characterized by the fact that the rubber cushion is mounted near a clutch lever joint on the pedal mount or on a stationary part attached to the pedal mount and that it interacts at its free end with the clutch lever.

4. A device in accordance with claim 2, characterized by the fact that the rubber cushion is mounted on the clutch lever near a clutch lever joint and that it interacts at its free end with the pedal mount or with a stationary part attached to the pedal mount.

5. A device in accordance with claim 2, characterized by the fact that the rubber cushion has a linear spring characteristic.

6. A device in accordance with claim 2, characterized by the fact that the rubber cushion has a nonlinear spring characteristic.

7. A vehicle clutch mechanism comprising a clutch lever pivotally mounted on a pivot axis and being movable between an engaged position and a disengaged position; a clutch pedal spring means for producing a force on the clutch lever and being disposed between a stationary member and the clutch lever such that the clutch pedal spring force is alignable at a center position with the pivot axis when the clutch lever is intermediate the engaged and disengaged positions and cooperating with the clutch lever to provide a force urging the clutch lever toward the engaged position on one side of the center position and toward the disengaged position on the other side of the center position; and spring means cooperating with the clutch lever to impose thereon a force toward the disengaged position only when the clutch lever is between the engaged position and the center position.

* * * * *